(12) United States Patent
Wu et al.

(10) Patent No.: US 12,245,198 B2
(45) Date of Patent: Mar. 4, 2025

(54) SYSTEMS AND METHODS FOR SRS TRIGGERING FLEXIBILITY ENHANCEMENT

(71) Applicant: ZTE CORPORATION, Guangdong (CN)

(72) Inventors: Hao Wu, Shenzhen (CN); Chuangxin Jiang, Shenzhen (CN); Shujuan Zhang, Shenzhen (CN); Ke Yao, Shenzhen (CN); Yuxin Wang, Shenzhen (CN); Bo Gao, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 333 days.

(21) Appl. No.: 17/876,945

(22) Filed: Jul. 29, 2022

(65) Prior Publication Data

US 2023/0023724 A1 Jan. 26, 2023

Related U.S. Application Data

(63) Continuation of application No. PCT/CN2020/138991, filed on Dec. 24, 2020.

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0051* (2013.01); *H04W 72/0446* (2013.01); *H04W 72/23* (2023.01); *H04W 76/20* (2018.02)

(58) Field of Classification Search
None
See application file for complete search history.

(56) References Cited

U.S. PATENT DOCUMENTS

| 2018/0206132 A1* | 7/2018 | Guo ................. H04W 72/0473 |
| 2018/0359781 A1 | 12/2018 | Yoon et al. |

(Continued)

FOREIGN PATENT DOCUMENTS

| CN | 110536423 A | 12/2019 |
| CN | 110536451 A | 12/2019 |

(Continued)

OTHER PUBLICATIONS

Ad-Hoc Chair (Samsung), "Session notes for 8.1 (Further enhancements on MIMO for NR)" 3GPP TSG RAN WG1 Meeting #103-e, R1-2009832, Oct. 26, 2020, e-Meeting (17 pages).

(Continued)

*Primary Examiner* — Otis L Thompson, Jr.
(74) *Attorney, Agent, or Firm* — Foley & Lardner LLP

(57) ABSTRACT

Systems, methods and devices for SRS triggering flexibility enhancement may include a wireless communication device receiving, from a wireless communication node, a first signaling indicative of at least one list of offset (t) values. The wireless communication device may receive, from the wireless communication node, a second signaling indicative of at least a first t value to select from the at least one list of t values. The first t value is used to indicate a location of at least an available slot for transmission of at least a first sounding reference signal (SRS) resource of a plurality of SRS resources.

20 Claims, 8 Drawing Sheets

(51) Int. Cl.
*H04W 72/0446* (2023.01)
*H04W 72/23* (2023.01)
*H04W 76/20* (2018.01)

(56) References Cited

U.S. PATENT DOCUMENTS

| | | | | |
|---|---|---|---|---|
| 2020/0313816 | A1* | 10/2020 | Sun | H04L 5/0051 |
| 2020/0382253 | A1* | 12/2020 | Manolakos | H04W 72/23 |
| 2021/0160104 | A1* | 5/2021 | Wu | H04L 5/0007 |
| 2021/0409178 | A1* | 12/2021 | Faxer | H04L 5/0053 |
| 2022/0337373 | A1* | 10/2022 | Wu | H04L 5/0091 |
| 2022/0393826 | A1* | 12/2022 | Shi | H04L 5/0051 |
| 2023/0079945 | A1* | 3/2023 | Manolakos | H04L 1/08 370/329 |
| 2023/0300806 | A1* | 9/2023 | Haghighat | H04L 5/0053 370/329 |

FOREIGN PATENT DOCUMENTS

| | | |
|---|---|---|
| CN | 110650001 A | 1/2020 |
| CN | 111586858 A | 8/2020 |
| WO | WO-2018/097586 A1 | 5/2018 |

OTHER PUBLICATIONS

Apple Inc., "Views on Rel-17 SRS enhance" 3GPP TSG RAN WG1 #102-e, R1-2006504, Aug. 17, 2020, e-Meeting (3 pages).

Apple Inc., "Views on Rel-17 SRS enhancement" 3GPP TSG-RAN WG1 Meeting #103-e, R1-2008443, Oct. 26, 2020, e-Meeting (4 pages).

Futurewei, "Enhancements on SRS flexibility, coverage and capacity" 3GPP TSG RAN WG1 #102-e, R1-2005288, Aug. 17, 2020, e-Meeting (7 pages).

Intel Corporation, "Discussion on SRS enhancements" 3GPP TSG RAN WG1 Meeting #102-e, R1-2005863, Aug. 17, 2020, e-Meeting (13 pages).

Interdgital Inc, "Discussion on SRS Enhancements" 3GPP TSG RAN WG1 #103-e, R1-2007631 Oct. 26, 2020, e-Meeting (6 pages).

Lenovo, et al., "Enhancements on SRS" 3GPP TSG RAN WG1#103-e, R1-2008914, Oct. 26, 2020, e-Meeting (7 pages).

Mediatek Inc., "Enhancements on SRS flexibility, coverage and capacity" 3GPP TSG RAN WG1 #102, R1-2005622, Aug. 17, 2020, e-Meeting (5 pages).

Moderator (ZTE), "FL summary #3 on SRS enhancements" 3GPP TSG RAN WG1 Meeting #103-e, R1-2009723, Oct. 26, 2020, e-Meeting (7 pages).

Nokia et al., "Discussion on SRS enhancement" 3GPP TSG-RAN WG1 Meeting #103-e, R1-2009255, Oct. 16, 2020, e-Meeting (31 pages).

Nokia et al., "Enhancements on SRS flexibility, Coverage and Capacity" 3GPP TSG RAN WG1 #103-e, R1-2008908, Oct. 23, 2020, e-Meeting (13 pages).

Nokia et al., "Enhancements on SRS flexibility, Coverage and Capacity" 3GPP TSG RAN WG1 #103-e, R1-2009421, Oct. 23, 2020, e-meeting (14 pages).

NTT Docomo, Inc, "Discussion on SRS enhancement" 3GPP TSG RAN WG1 #103-e, R1-2009179, Oct. 26, 2020, e-Meeting (13 pages).

OPPO, "Enhancements on SRS flexibility, coverage and capacity" 3GPP TSG RAN WG1 #102-e, R1-2005988, Aug. 17, 220, e-Meeting (4 pages).

OPPO, "Enhancements on SRS flexibility, coverage and capacity" 3GPP TSG RAN WG1 #103-e, R1-2008222, Oct. 26, 2020, e-meeting (10 pages).

Qualcomm Incorporated, "Enhancements on SRS flexibility, switching, coverage and capacity" 3GPP TSG-RAN WG1 Meeting #102-e, R1-2006795, Aug. 17, 2020, e-Meeting (27 pages).

Samsung, "Enhancements on SRS" 3GPP TSG RAN WG1 #103-e, R1-2008153, Oct. 26, 2020, e-Meeting (5 pages).

Extended European Search Report for EP App. No. 20966468.9 dated Feb. 15, 2024 (10 pages).

Moderator (ZTE), "FL summary #1 on SRS enhancements," 3GPP TSG RAN WG1 Meeting #103-e; R1-2009384; Oct. 26-Nov. 13, 2020; e-Meeting (29 pages).

International Search Report and Written Opinion for PCT Appl. No. PCT/CN2020/138991, mailed Sep. 28, 2021 (8 pages).

* cited by examiner

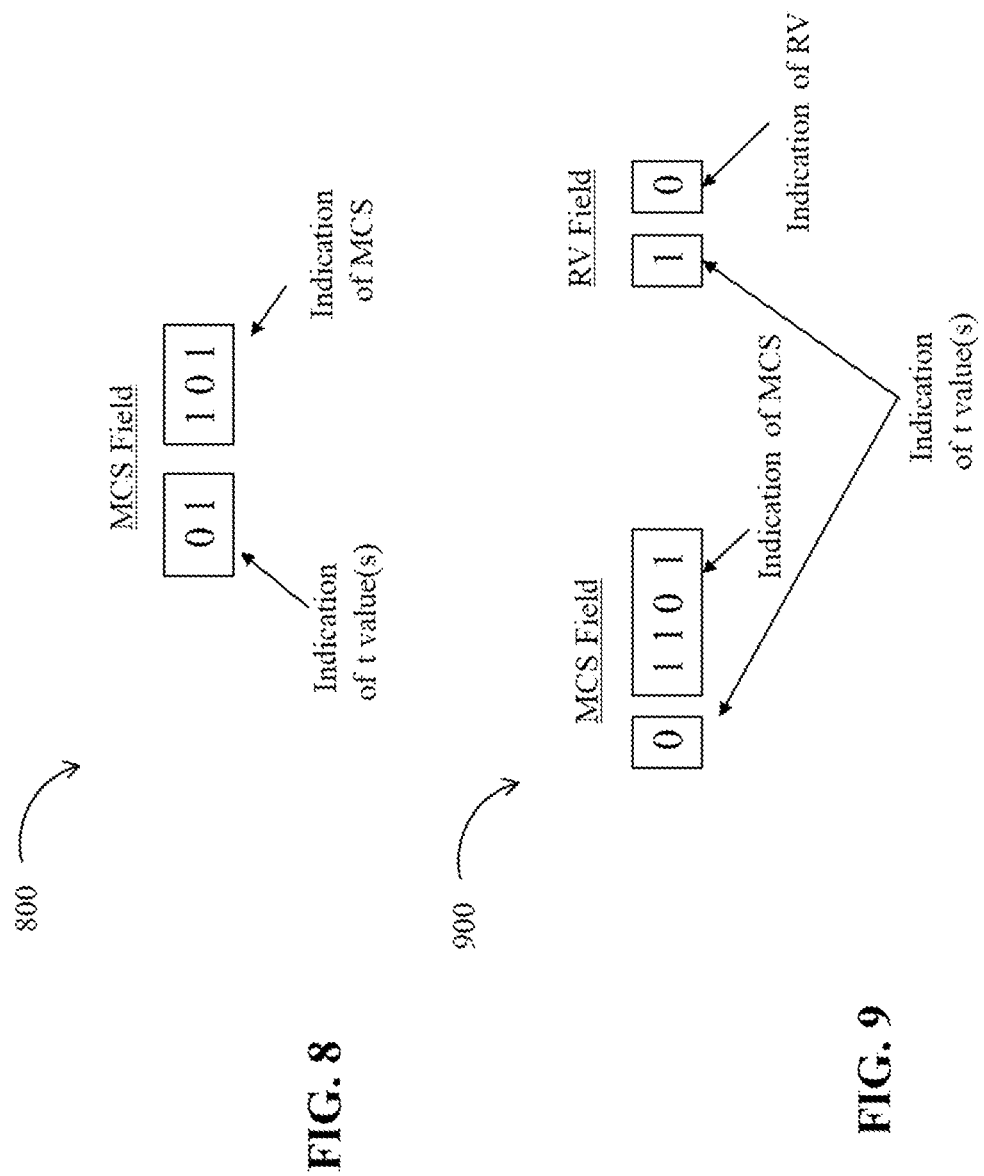

SYSTEMS AND METHODS FOR SRS TRIGGERING FLEXIBILITY ENHANCEMENT

CROSS-REFERENCE TO RELATED APPLICATION

This application claims the benefit of priority under 35 U.S.C. § 120 as a continuation of PCT Patent Application No. PCT/CN2020/138991, filed on Dec. 24, 2020, the disclosure of which is incorporated herein by reference in its entirety.

TECHNICAL FIELD

The disclosure relates generally to wireless communications, including but not limited to systems and methods for improving the flexibility of sound reference signal (SRS) triggering in wireless communication systems.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive, from a wireless communication node, a first signaling indicative of at least one list of offset (t) values. The wireless communication device may receive, from the wireless communication node, a second signaling indicative of at least a first t value to select from the at least one list of t values. The first t value is used to indicate a location of at least an available slot for transmission of at least a first sounding reference signal (SRS) resource of a plurality of SRS resources.

In some embodiments, the first t value may be an integer smaller than 0, and the location of the available slot may be a |t|$^{th}$ available slot before a location of a reference slot. In some embodiments, the first t value may be an integer greater than or equal to 0, and the location of the available slot may be a $(t+1)^{th}$ available slot counting from a location of a reference slot. The reference slot may comprise at least one of a slot with a downlink control information (DCI) triggering transmission of at least the first SRS resource, or a slot indicated by a triggering offset configured via radio resource control (RRC) signaling.

In some embodiments, the wireless communication device may perform collision handling between the transmission and any other uplink transmission, after available slots for the transmission have been determined. In some embodiments, the wireless communication device may determine to group the plurality of SRS resources into M groups of SRS resources, according to a configuration of the wireless communication node or a predefined rule. The wireless communication device may determine M available slots each for transmitting a respective one of the M groups of SRS resources. The M groups may comprise an SRS resource set or a subset of an SRS resource set. The subset may comprise at least one SRS resource. The wireless communication device may determine to group the plurality of SRS resources into the M groups of SRS resources according to at least one of the predefined rule, which indicates that each of the M groups has an equal number of SRS resources from the plurality of SRS resources, or the configuration of the wireless communication node, which indicates that each SRS resource of the plurality of SRS resources is associated with one of the M groups.

The first signaling may be indicative of a respective list oft values for each of the M groups. The second signaling may include at least a state that is indicative of the first t value. The first t value is associated with a plurality oft values each associated with a respective one of the M groups. The second signaling may be indicative of a first available slot in the M available slots, and the M available slots may be successive available slots starting from the first available slot. The available slot may comprise a slot that includes one or more uplink or flexible symbols for one or more time-domain locations of SRS resources in one of the M groups.

In some embodiments, the available slot may comprise a slot that includes one or more uplink or flexible symbols for one or more time-domain locations of at least one SRS resource from the plurality of SRS resources.

In some embodiments, the available slot may comprise a slot that includes one or more uplink or flexible symbols for one or more time-domain locations of at least one SRS resource from a subset of the plurality of SRS resources. At least one of the following applies: (i) SRS resources in the subset do not overlap in time domain, (ii) a gap of a least one symbol is present between time domain resources of any two SRS resources from the subset, or (iii) if two SRS resources from the subset have overlapping symbols in time domain, one of the two SRS resources having at least one of a smaller identifier (ID), a smaller index within the plurality of SRS resources, or a smaller start position in time domain, relative to another of the two SRS resources, is selected for transmission. The subset may excludes SRS resources from the plurality of SRS resources that have been transmitted prior to the available slot.

In some embodiments, a number of slots, between a first available slot and a last available slot for transmitting the plurality of SRS resources, may not exceed a threshold number of slots. The wireless communication device may report, to the wireless communication node, the threshold number of slots.

In some embodiments, the second signaling may comprise downlink control information (DCI), and at least one bit of one or more fields other than SRS request field in the DCI are used to indicate at least one of the t values. At least one most significant bit (MSB) of the one or more fields other than SRS request field in the DCI may be used to indicate the at least one of the t values, or at least one bit of a first field in the DCI and at least one bit of a second field in the DCI may be concatenated to indicate the at least one of the t values. Whether the at least one bit of one or more fields other than SRS request field in the DCI may be used to indicate at least one of the t values, is determined according to at least one of (i) the SRS request field, (ii) whether partial frequency sounding or SRS repetition is configured, (iii) a radio network temporary identifier (RNTI) of the DCI, or (iv) at least one channel quality indicator (CQI) reported by the wireless communication device.

At least one aspect is directed to a system, method, apparatus, or a computer-readable medium. A wireless communication node may transmit, to a wireless communication device, a first signaling indicative of at least one list of offset (t) values. The wireless communication node may transmit, to the wireless communication node, a second signaling indicative of at least a first t value to select from the at least one list oft values. The first t value is used to indicate a location of at least an available slot for transmission of at least a first sounding reference signal (SRS) resource of a plurality of SRS resources.

Embodiments described herein provide solutions for the technical problem of improving the flexibility of aperiodic SRS triggering. For a number of SRS resources triggered by a DCI, the wireless communication device may determine M available slots to transmit them, where M is an integer greater than or equal to 1. The wireless communication device may determine the location of the M available slots based on a t value. The wireless communication device can be notified of one or more list oft values by a first signaling, and can be notified of a selection of one or more t values from the one or more list by a second signaling.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 8 shows a diagram illustrating an example of using MCS bits to indicate the slot offset value, in accordance with example embodiments of the current disclosure; and FIG. 9 shows a diagram illustrating an example of using bits from multiple DCI fields to indicate the slot offset value, in accordance with example embodiments of the current disclosure.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Mobile Communication Technology and Environment

Figure 1:
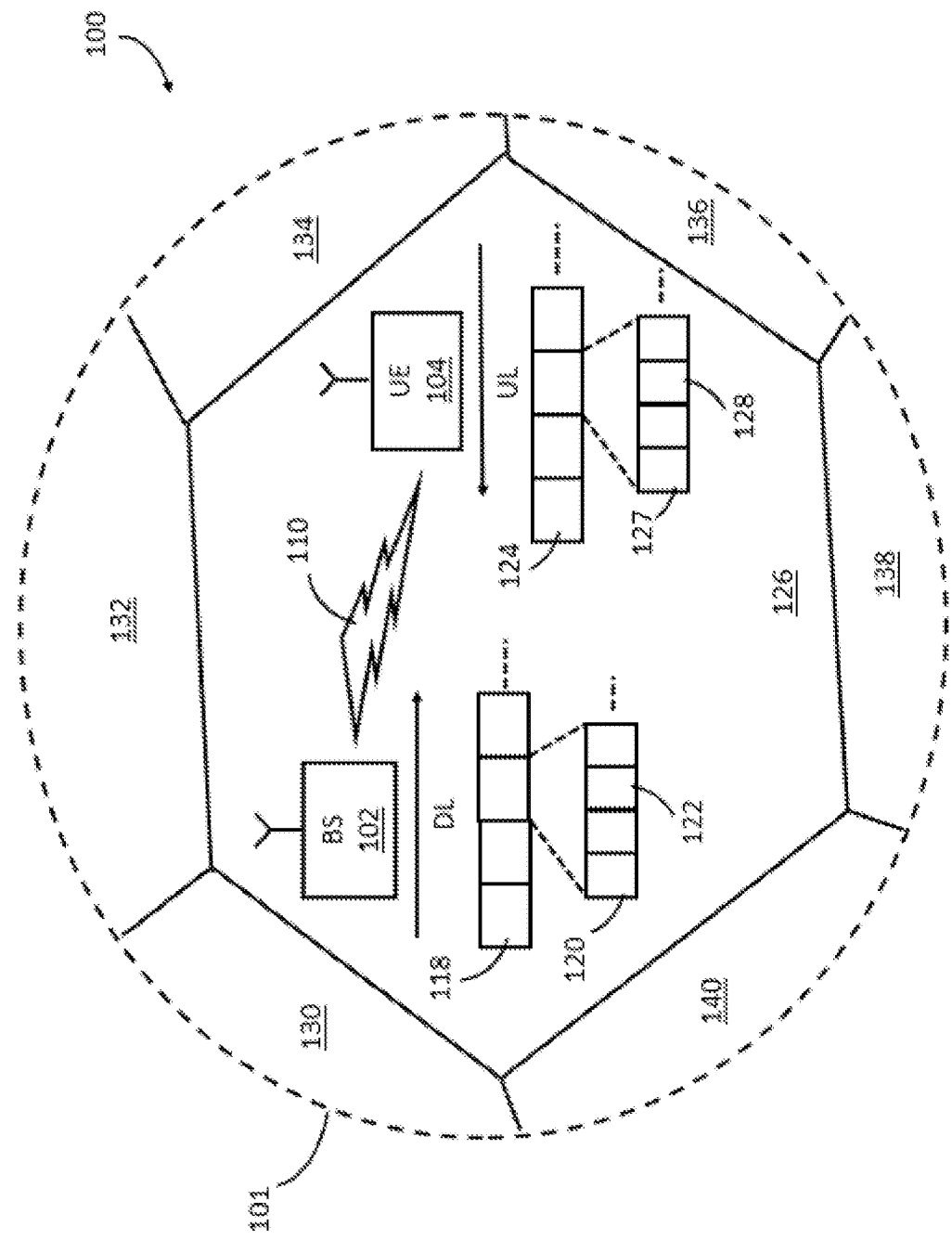
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127, which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
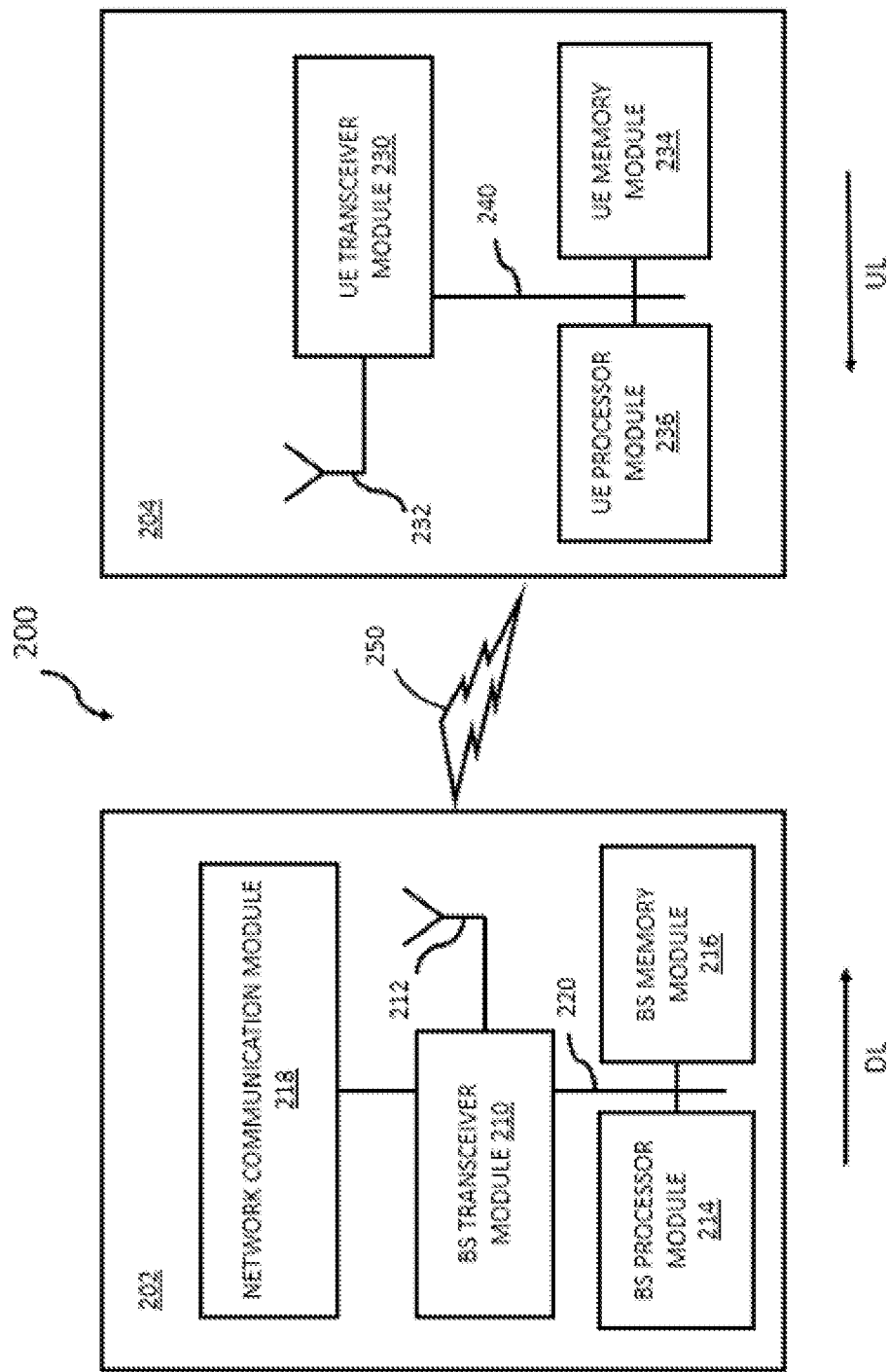
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be a 5G node B (gNB), an evolved node B (eNB), a serving eNB or gNB, a target eNB or gNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer. 2. Systems and Methods for Improving Flexibility of Aperiodic SRS Triggering In wireless communication systems, wireless communication nodes and/or wireless communication devices can use a sounding reference signal (SRS) for uplink (UL) or downlink (DL) channel measurement. There are multiple usages for SRS, such as DL channel state information (CSI) acquisition (e.g., antenna switching), codebook based UL, non-codebook based UL, beam management and so on. Each SRS resource set can be configured with one or more usages. An SRS resource set can include one or multiple SRS resources.

There are multiple time-domain types of SRS, including periodic SRS, semi-persistent SRS and aperiodic SRS. The time-domain type can be configured per SRS resource set. That is, each SRS resource set can have a respective time-domain type. Aperiodic SRS is usually triggered dynamically by downlink control information (DCI). Specifically, DCI can be used to indicate the transmission of SRS resources in an SRS resource set. A wireless communication device 104 or 204 can determine the time slot to transmit the triggered SRS resources based on a RRC-configured triggering offset for the resource set. The triggering offset can indicate the number of time slots between the time slot containing trigger DCI and the time slot to transmit the SRS. However, employing a fixed offset limits the flexibility to triggering SRS, as the time slots between the time slot containing trigger DCI and the time slot to transmit the SRS may contain non-available time slots (e.g., DL slots) for SRS transmission. Specifically, if the slot to transmit the SRS is unavailable, the wireless communication device 104 or 204 may need to wait for the next trigger DCI to determine when to send the SRS. Given the dynamic nature of wireless communication channels, a delayed channel measurement can lead to channel degradation.

In the current disclosure, various embodiments for solving the technical problem described above and enhancing the flexibility of aperiodic SRS triggering are described. As used herein, a UL or U time slot refers to a slot having only UL symbols. A DL or D slot refers to a time slot having only DL symbols. Flexible symbols are symbols which can be used for either DL or UL. A flexible slot or S slot refers to a time slot with at least two symbol types from DL symbols, UL symbols and flexible symbols.

Figure 3:
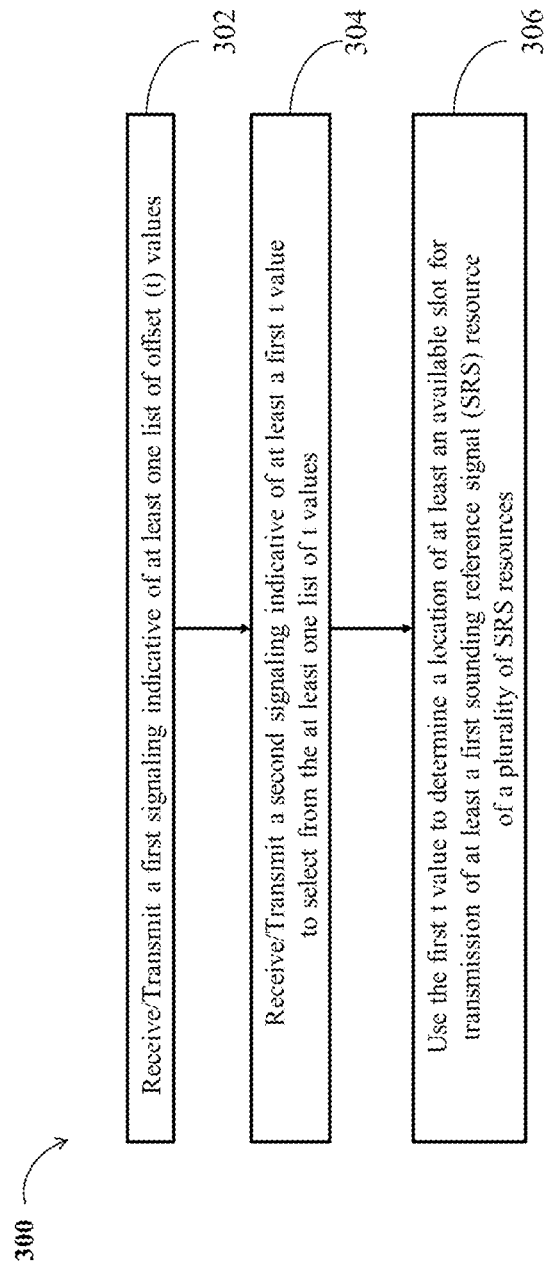
FIG. 3 shows a flowchart illustrating a method for wireless communication, in accordance with some embodiments of the present disclosure.

Referring to FIG. 3, a flowchart illustrating a method 300 for wireless communication is shown, in accordance with some embodiments of the present disclosure. The method 300 can include a wireless communication node 102 or 202 transmitting, and/or a wireless communication device 104 or 204 receiving, a first signaling indicative of at least one list of offset (t) values (STEP 302). The method 300 can include the wireless communication node 102 or 202 transmitting, and/or the wireless communication device 104 or 204 receiving, a second signaling indicative of at least a first t value to select from the at least one list oft values (STEP 304). The first t value can be used to indicate a location of at least an available slot for transmission of at least a first sounding reference signal (SRS) resource of a plurality of SRS resources. The method 300 may further include the wireless communication device 104 or 204 using the first t value to determine the location of the at least an available slot for transmission of at least the first sounding reference signal (SRS) resource of the plurality of SRS resources (STEP 306).

The method 300 can be performed according to a variety of schemes or approaches. Specifically, the at least one list of offset (t) values and/or the at least first t value can be defined in various ways. According to a first approach or scheme, the flexibility of SRS triggering can be improved by skipping or ignoring non-available slots. For instance, a slot offset value t can indicate the number of available slots between a reference slot and the slot to transmit the triggered aperiodic SRS. Based on the slot offset value t, the wireless communication device 104 or 204 can determine to transmit the triggered SRS in the $(t+1)^{th}$ available time slot counting from the reference time slot. The reference slot can be the time slot that includes the triggering DCI, or a time slot indicated by a RRC configured triggering offset (e.g., different from the time slot that includes the triggering DCI).

Figures 4A, 4B:
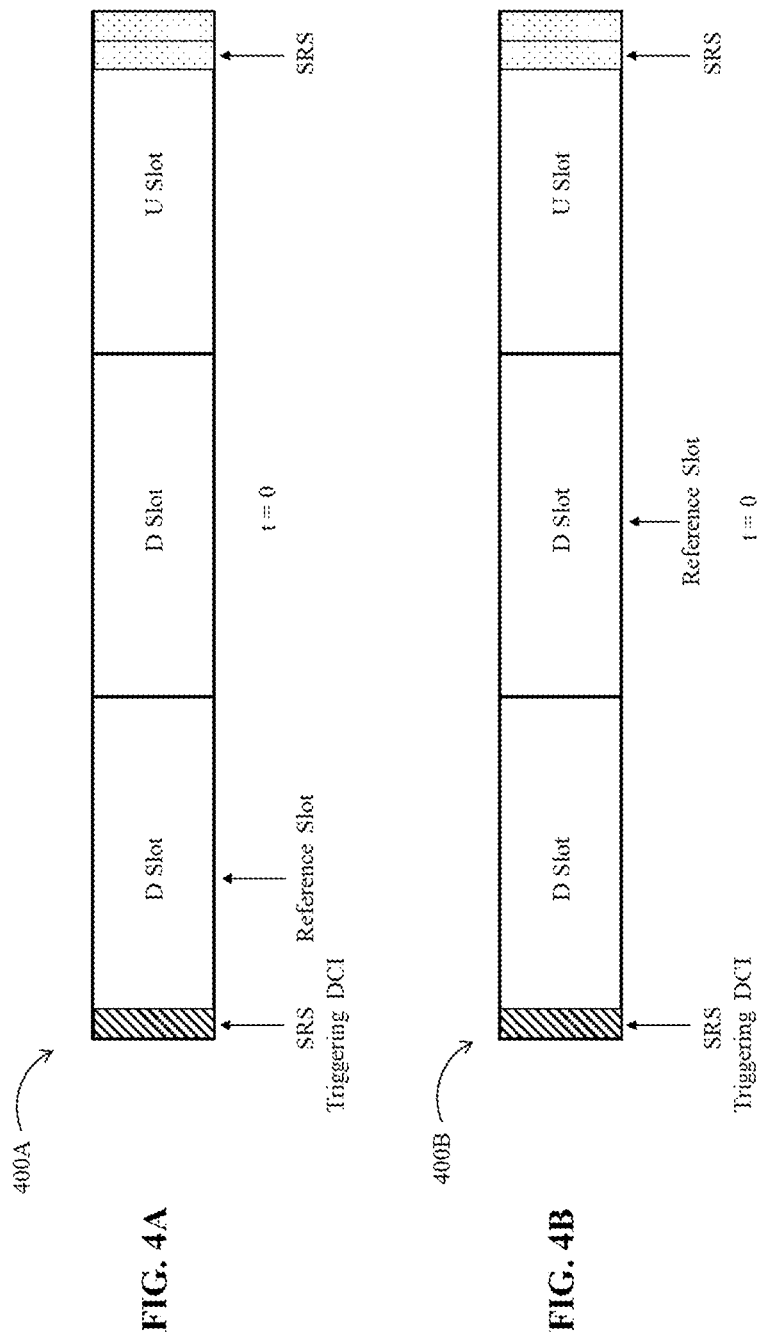
FIGS. 4A and 4B show diagrams illustrating two examples of SRS triggering offset enhancement are shown, in accordance with some embodiments of the present disclosure.

Referring to FIGS. 4A and 4B, diagrams 400A and 400B illustrating two examples of SRS triggering offset enhancement are shown, in accordance with some embodiments of the present disclosure. The wireless communication device 104 or 204 can determine a time slot to transmit SRS based on a reference slot and a slot offset value t, where t represents the number of available slots (e.g., counting from the reference slot) between the reference slot and the slot to transmit the triggered SRS. The slot offset value t may be an integer. In both FIGS. 4A and 4B, the slot offset value t is equal to 0. In FIG. 4A, the reference slot is the slot that includes the triggering DCI, while in FIG. 4B the reference slot is a slot indicated by a RRC configured triggering offset. The RRC configured triggering offset can indicate the number of slots between the slot that incudes the triggering DCI and the reference slot. The wireless communication device 104 or 204 may determine the time slot to transmit SRS as the $(t+1)^{th}$ available slot counting from the reference slot.

If t=0, the wireless communication device 104 or 204 may determine the available slot as the first slot counting from the reference slot. If the reference slot is an available slot, the first available slot is the reference slot. Otherwise, the first available slot is the first available slot after the reference slot. If t>0, the $(t+1)^{th}$ available slot is after the reference slot. Since t=0 and the reference slot is a DL slot (not an available slot) in both FIGS. 4A and 4B, the time slot to transmit SRS in both examples is the first available slot after the reference slot.

As defined herein, an available slot is a slot that satisfies the following conditions: (i) the slot contains UL or flexible symbol(s) for the time-domain location(s) of all the SRS resources in the resource set, and (ii) it satisfies the minimum timing requirement between triggering physical DL control channel (PDCCH) and all the SRS resources in the resource set.

Figure 5:
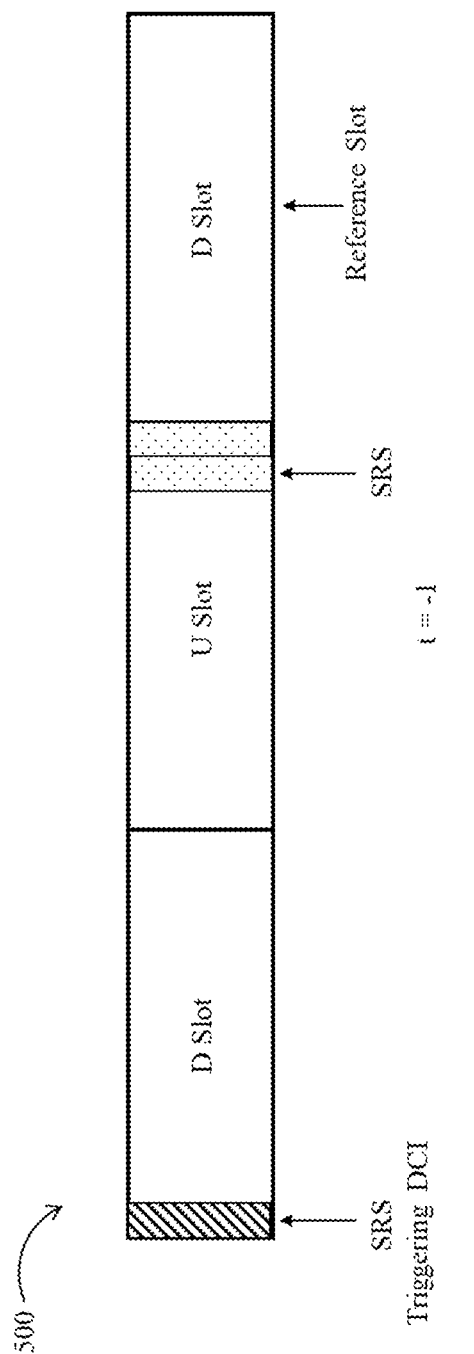
Referring to FIG. 5 shows a diagram illustrating another example of SRS triggering offset enhancement with negative slot offset value t, in accordance with some embodiments of the present disclosure.

Referring to FIG. 5, a diagram 500 illustrating another example of SRS triggering offset enhancement with negative slot offset value t is shown, in accordance with some embodiments of the present disclosure. In some cases, the slot offset value t may be smaller than 0. In such cases case, the reference slot may be after the slot that includes the SRS triggering DCI and the slot to transmit SRS may be an available slot before the reference slot. For a slot offset value t<0, the corresponding available slot to transmit SRS may be the $|t|^{th}$ available slot before the reference slot. For instance, the reference slot in FIG. 5 is a slot, after the slot that includes the SRS triggering DCI, indicated by a RRC configured parameter. Since t=−1, the slot to transmit SRS is the first available slot before the reference slot.

In some implementations, the processing complexity for determining an available slot to transmit SRS may be relaxed. To achieve such relaxation in processing complexity, (1) the wireless communication device 104 or 204 may not expect to receive slot format indicator (SFI) in DCI between the first symbol of the DCI triggering the SRS and the last symbol of the triggered SRS resources, or (2) the wireless communication device 104 or 204 may not expect slot format change between the first symbol of the DCI triggering the SRS and the last symbol of the triggered SRS resources. Otherwise, the wireless communication device 104 or 204 may determine the available slot to transmit the SRS at a given time. If the wireless communication device 104 or 204 receives an SFI to change the slot format or symbol format between the first symbol of the DCI triggering the SRS and the last symbol of the triggered SRS resources, the wireless communication device 104 or 204 can omit the transmission of SRS in the symbols with the corresponding format changed. The above given time can be the time of the first symbol of the SRS triggering DCI.

The wireless communication device 104 or 204 may handle collision between the triggered SRS and any other UL signal/channel after the determination of the available slot to transmit SRS. Specifically, collision relates to overlapping symbols between the triggered SRS and the other UL signal or channel. If the priority of the triggered SRS is higher than the other UL signal or channel, the wireless communication device 104 or 204 may transmit the triggered SRS and omit the transmission of the other UL signal or channel at least with respect to overlapping symbols. If the priority of the triggered SRS is lower than the other UL signal or channel, the wireless communication device 104 or 204 may omit the transmission of the SRS and transmit the other UL signal or channel at least with respect to overlapping symbols.

By skipping of non-available slots the network's flexibility to trigger aperiodic SRS is significantly improved. Specifically, by defining the slot offset value t to refer to a number of available slots between the reference slot and the slot to transmit SRS, the latter is always an available slot. Therefore, the case where the slot offset value t may point to a non-available slot is avoided.

The wireless communication node 102 or 202 (or the network) can configure a list of t values in RRC for transmitting to the wireless communication device 104 or 204. The wireless communication node 102 or 202 (or the network) can transmit the offset value t to the wireless communication device 104 or 204 in DCI. In other words, the DCI can indicate to the wireless communication device 104 or 204 a selection of a t value from the list of t values. In some implementations, the wireless communication node 102 or 202 (or the network) can use a media access control layer control element (MAC CE) to activate a subset of the configured list of t values, and the DCI can indicate a selection of a t value from the activated subset.

In some embodiments, the triggered SRS may require to be transmitted in more than one slot. For example, in the case of SRS antenna switching of 1T4R, 1T6R, 1T8R and 2T8R, or the in case where repetition or frequency hopping is used, the triggered SRS resource set cannot be contained in one slot. Supporting triggering SRS resources in multiple available slots calls for further enhancement of the approach discussed above with regard to the first scheme.

According to a second scheme or approach, SRS resources can be triggered to be transmitted in multiple available slots while allowing for SRS triggering flexibility. For X triggered SRS resources, the wireless communication device 104 or 204 may determine how to group these X resources into M groups, each to be transmitted in a corresponding slot. The wireless communication device 104 or 204 may group the triggered SRS resources based on the wireless communication node's configuration or a predefined rule. The wireless communication device 104 or 204 may determine M available slots to transmit the X SRS resources or the M groups of SRS resources. An $m^{th}$ available slot, where 1≤m≤M, can be defined as a slot satisfying the following: (i) the slot contains UL or flexible symbol(s) for the time-domain location(s) of the SRS resources in $m^{th}$ slot, and (2) it satisfies the minimum timing requirement between triggering PDCCH and the SRS resources in $m^{th}$ slot.

The wireless communication device 104 or 204 may determine the grouping of the X SRS resources into M groups, or M slots, according to various implementations or methods. For instance, the wireless communication device 104 or 204 may group the X SRS resources based on a predefined rule. For example, the wireless communication device 104 or 204 may group the X SRS resources into M slots (or groups) equally, where X/M resources are transmitted in each slot. The X SRS resources can be configured in one SRS resource set, and the wireless communication device 104 or 204 can group them into M subsets associated with M slots respectively. Alternatively, the X SRS resources can be configured in M SRS resource sets associated with M slots respectively.

In some implementations, the wireless communication device 104 or 204 may group the X SRS resources based on a configuration of the wireless communication node 102 or 202. For example, the wireless communication node can configure the X SRS resources into M SRS resource sets. Different resource sets can have different numbers of resources. The wireless communication device 104 or 204 can associate each SRS resource set with a corresponding slot. Alternatively, the X SRS resources can be configured in one resource set, and the wireless communication node 102 or 202 may further configure the X SRS resources in M subsets. Different subsets can have different numbers of SRS resources. The wireless communication device 104 or 204 may associate each subset is with a corresponding slot. For example, for 1T8R antenna switching SRS, the wireless communication node 102 or 202 can configure the 8 resources into three groups having, for example, 2, 2 and 4 resources, respectively.

The wireless communication device 104 or 204 can determine M available slots to transmit the X triggered SRS resources according to various implementations or methods. In some implementations, DCI or RRC can indicate the first of the M available slots where the M available slots are M successive available slots. Upon receiving DCI indicating a t value, the wireless communication device 104 or 204 can determine the first available slot of the M available slots to transmit SRS, for example, as the $(t+1)^{th}$ available slot counting from the reference slot. The wireless communication device 104 or 204 can determine the $m^{th}$ slot of the M available slots to transmit SRS as the $(t+m)^{th}$ available slot counting from the reference slot. The wireless communication device 104 or 204 can employ this approach of determining the M available slots with any of the methods of grouping the X SRS resources into M groups described above.

Figure 6:
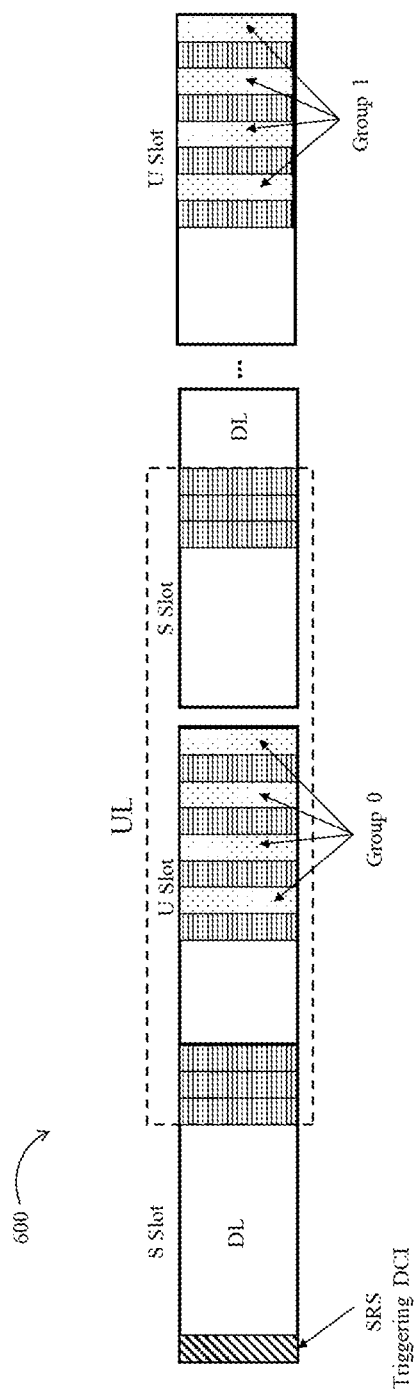
FIG. 6 shows a diagram illustrating an example of associating SRS resources, grouped according to a predefined rule, to distinct slots, in accordance with some embodiments of the present disclosure.

Referring to FIG. 6, a diagram 600 illustrating an example of associating SRS resources, grouped according to a predefined rule, to distinct slots is shown, in accordance with some embodiments of the present disclosure. Eight SRS resources are configured in time domain locations {7}, {9}, {11}, {13}, {7}, {9}, {11}, {13}. The wireless communication device 104 or 204 has grouped the eight SRS resources in two groups, Group 0 and Group 1. The first four SRS resources form Group 0, and the second four resources form Group 1. The two groups of SRS resources call for two slots to transmit the triggered SRS resources. In a first case of FIG. 6, t can be equal to 0 and the reference slot can be the slot that includes the triggering DCI. In this first case, the wireless communication device 104 or 204 determines to transmit Group 0 in the first available after the slot that includes the triggering DCI since the latter is not an available time slot. In a second case of FIG. 6, the reference slot can be different than the slot including the triggering DCI and the slot offset value t can be smaller than 0 in FIG. 6. In this second case, the wireless communication device 104 or 204 determines the first slot to transmit SRS as the $|t|^{th}$ available slot before the reference slot.

In FIG. 6, the wireless communication device 104 or 204 determines the U slot immediately subsequent to the slot that includes the triggering DCI to be the first available slot, and determines to transmit Group 0 in this first available slot. Also, the wireless communication device 104 or 204 determines a later U slot to be the next, or second, available slot, and determines to transmit Group 1 in this second available slot. Specifically, the wireless communication device determines to transmit Group 0 in the time domain locations {7}, {9}, {11} and {13} of the first available slot, and to transmit Group 1 in the time domain locations {7}, {9}, {11} and {13} of the second available slot. The S slot subsequent to the first determined available slot is not an available slot because not all the time domain locations {7}, {9}, {11} and {13} of that slot are available.

While FIG. 6 shows an example with two groups of SRS resources, the same approach applies if M is greater than 2. That is, the wireless communication device 104 or 204 can determine the first available slot as the $(t+1)^{th}$ counting forward from the reference slot if t≥0, or as the $|t|^{th}$ available slot before the reference slot if t<0. Also, the wireless communication device 104 or 204 can determine the $m^{th}$ available slot of the M available slots to transmit the SRS as the $m^{th}$ available slot counting forward from the first available slot.

In some implementations, the wireless communication device 104 or 204 (or the network) can group the X SRS resources into M groups associated with M slots respectively, e.g., according to any of the grouping methods described above, where each group is an SRS resource set or subset. The RRC configuration may configure a list of t values per group. The DCI can indicate the t values for these groups jointly. For example, if each SRS resource group is configured with a corresponding list having no more than $X_m$ t values, a state given by DCI codepoint can indicate the t value to be selected from each of the lists. For example, the DCI codepoint can indicate that the $k^{th}$ t value in every SRS resource group is to be selected, where $1≤k≤X_m$. The state given by DCI can be a DCI codepoint, an entry or an indication state (e.g., triggering state) of one or more fields like TDRA, SRS request and so on. Table 1 below illustrates an association between example codepoint values, or states given by DCI, and corresponding t values to be selected from the SRS resource groups. A variant of this approach can include the wireless communication node 102 or 202 configuring a list for all the groups of SRS resources, where each entry in the list contains M t values and is associated with a state given by DCI.

TABLE 1

An example of using DCI to indicate
t values for multiple groups of SRS resources

| State given by DCI | SRS resource group 0 | SRS resource group 1 | SRS resource group 2 | SRS resource group 3 |
|---|---|---|---|---|
| 0 | $1^{st}$ t value in the list of group 0 | $1^{st}$ t value in the list of group 1 | $1^{st}$ t value in the list of group 2 | $1^{st}$ t value in the list of group 3 |
| 1 | $2^{nd}$ t value in the list of group 0 | $2^{nd}$ t value in the list of group 1 | $2^{nd}$ t value in the list of group 2 | $2^{nd}$ t value in the list of group 3 |

TABLE 1-continued

An example of using DCI to indicate
t values for multiple groups of SRS resources

| State given by DCI | SRS resource group 0 | SRS resource group 1 | SRS resource group 2 | SRS resource group 3 |
| --- | --- | --- | --- | --- |
| 2 | $3^{rd}$ t value in the list of group 0 | $3^{rd}$ t value in the list of group 1 | $3^{rd}$ t value in the list of group 2 | $3^{rd}$ t value in the list of group 3 |
| 3 | $4^{th}$ t value in the list of group 0 | $4^{th}$ t value in the list of group 1 | $4^{th}$ t value in the list of group 2 | $4^{th}$ t value in the list of group 3 |

For any of the approaches discussed above, in order to control the latency of SRS transmission, the time span of the triggered SRS transmission can be restricted. For example, the number of slots between the first and the last available slots in time to transmit the triggered SRS may not exceed a threshold of $M_{max}$ slots. In some implementations, the wireless communication node 102 or 202 may report the value of $M_{max}$ to the wireless communication device 104 or 204.

A third scheme is another approach to solve the issue of using multiple available slots to transmit triggered SRS resources. Since wireless channel is time-variant, large latency of the triggered SRS resources has negative impact on the system performance. Hence the third scheme is proposed to reduce the latency of the triggered SRS transmission by making better use of UL and flexible slots.

According to the third scheme, X SRS resources may be triggered for one or more sets for at least one usage in DCI. An available slot can be defined as a slot that (i) contains UL or flexible symbol(s) for the time-domain location(s) of at least one from the X SRS resources, and (ii) satisfies the minimum timing requirement between triggering PDCCH and the SRS resources. The wireless communication device 104 or 204 can employ, or execute, the following pseudo code to find available slots to transmit the triggered X SRS resources.

```
M_sum = 0;
S = 1;
X_set = Triggered X resources for one or more sets for at least one usage in DCI;
While M_sum < X (or X_set is not empty)
    (t+S)-th available slot is the next slot with UL or flexible symbols to transmit at
    least one SRS resource in X_set;
    M_S SRS resources in X_set are transmitted in (t+S)-th available slot, where M_S
    is the maximum value satisfying
        • the M_S SRS resources do not overlap in time domain,
        • there is at least one symbol gap between the time domain resources of any
          two of the M_S SRS resources,
        • (t+S)-th available slot contains UL or flexible symbols for the time domain
          locations of the M_S SRS resources,
        • If two SRS resources are configured with overlapped symbols, the one with
          {smaller ID, smaller index in the triggered X resources, and/or smaller
          start time-domain position} is selected in the M_S SRS resources;
    X_set = X_set − the M_S SRS resources;
    M_sum = M_sum + M_S;
    S = S + 1;
End while
```

An available slot can be viewed, or defined, as a slot that contains UL or flexible symbol(s) for the time-domain location(s) of at least one resource from a subset from the X SRS resources. The subset from the X SRS resources can satisfy at least one of (i) the SRS resources in the subset do not overlap in time domain, (ii) there is at least one symbol gap between the time domain resources of any two from the subset of SRS resources, and (iii) if two SRS resources have overlapping symbols, the one with smaller ID, smaller index in the triggered X resources, and/or smaller start time-domain position is selected in the subset of SRS resources. For a given slot, the subset from the X SRS resources excludes the SRS resources which have been transmitted before this slot.

Figure 7:
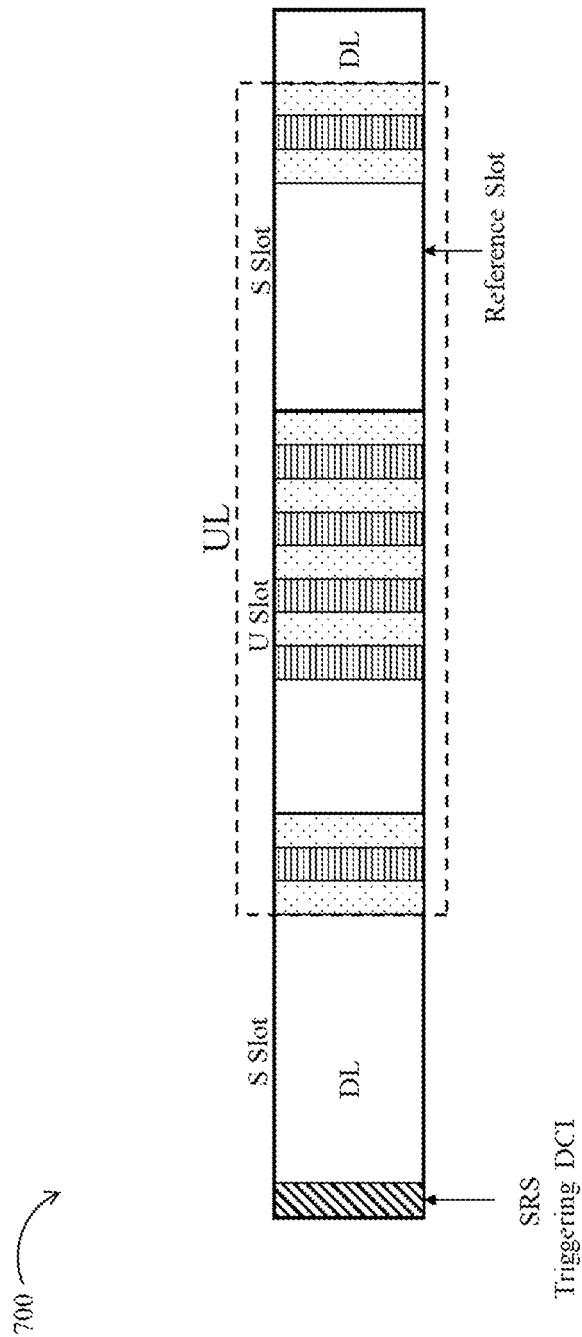
FIG. 7 shows a diagram illustrating an example of using the third scheme to transmit SRS resources, in accordance with some embodiments of the present disclosure.

Referring now to FIG. 7, a diagram 700 illustrating an example of using the third scheme to transmit SRS resources is shown, in accordance with some embodiments of the present disclosure. Considering 1T8R antenna switching SRS as an example, eight SRS resources are configured in time domain locations {7}, {9}, {11}, {13}, {7}, {9}, {11} and {13}. The dotted rectangles represent SRS symbols while the hashed rectangles represent other uplink symbols. A first subset (two SRS resources) of the triggered SRS resources is transmitted in the S slot in which the triggering DCI is received, a second subset (four SRS resources) is received in the UL slot subsequent to the slot in which the triggering DCI is received, and a third subset (two SRS resources) is received in another S slot subsequent to the UL slot in which the second subset is transmitted.

In some implementations, as the order to transmit the triggered SRS resources may not be the order in which these resources are configured in one or more resource sets, the a mapping between the wireless communication device antenna and the SRS resources can be clarified in case of SRS antenna switching. The mapping can be implemented in various ways. For instance, the mapping between the wireless communication device antenna and the triggered SRS resources can be based on the transmission order in time of the triggering SRS resources. The mapping between the wireless communication device antenna and the triggered SRS resources can be based on the order that the triggered SRS resources are configured in one or more resource sets.

In some implementations, the procedure described by the pseudocode can be revised to further reduce the latency to transmit SRS, as shown below. In each step of the iteration, the wireless communication device 104 or 204 can use an unchanged pool of time domain locations to transmit the triggered SRS resources. That is, the wireless communication device 104 or 204 may not remove the time domain locations of the transmitted SRS resources when searching available symbols in each slot. The revised procedure is illustrated by the pseudocode below.

```
M_sum = 0;
S = 1;
X_set = Triggered X resources for one or more sets for at least one usage in DCI;
TL_set = Set of time domain locations of the triggered X resources;
While M_sum < X (or X_set is not empty)
   (t+S)-th available slot is the next slot with UL or flexible symbols in TL_set;
   A set TL_S of symbols in TL_set are selected to transmit M_S SRS resources in
   X_set in (t+S)-th available slot, where M_S is the maximum value satisfying
    • there is at least one symbol gap between any two symbols in TL_S,
    • M_S resources are transmitted in the symbols of TL_S following the order of
      {resource ID, index in the configured one or more resource set, and/or start
      time-domain locations};
   X_set = X_set – the M_S SRS resources;
   M_sum = M_sum + M_S;
   S = S+ 1;
End while
```

In a further example, the procedure in the both pseudocodes above may be revised to be compatible with the resource grouping methods discussed above. To achieve this, each resource group may be used as a unit to search available slots to transmit all resources in the resource group.

A fourth scheme can include an approach on how to indicate one or more t values in DCI. DCI can be used to select one or more t values configured in RRC or activated by MAC CE. The approach can be to use partial bits of one or more bit fields other than SRS request in DCI to indicate one or more t values. For example, the highest B≥1 bits of a DCI field other than SRS request can be used to indicate the t value(s). In an example, this DCI field can be the MCS field, and B can be 1 or 2. For a K-bit MCS field, the highest B bits can be used to indicate t value(s), and the lowest K-B bits can be used to indicate MCS.

Referring to FIG. 8, a diagram 800 illustrating an example of using MCS bits to indicate the slot offset value is shown, in accordance with example embodiments of the current disclosure. In the example shown in FIG. 8, the two most significant bits (MSBs) of the MCS field are used to indicate the slot offset value t. In some implementations, bits of one or more fields, e.g., among the MCS field, NDI field and RV field of transport block 2 can be used to indicate the t value(s).

Referring to FIG. 9, a diagram 900 illustrating an example of using bits from multiple DCI fields to indicate the slot offset value is shown, in accordance with example embodiments of the current disclosure. Specifically, the slot offset value t is indicated by the highest bit of the MCS field and the highest bit of the RV field. In some implementations, the highest B1 bits from DCI field 1 and highest B2 bits from DCI field 2 can be used to indicate the slot offset value t. The wireless communication device 104 or 204 can concatenate the highest B1 bits from DCI field 1 and the highest B2 bits from DCI field 2 to determine the t value(s). If the size of DCI field 1 is K1 bits, and the size of DCI field 2 is K2 bits, the remaining K1-B1 bits and K2-B2 bits can be used to serve the original purposes for DCI field 1 and DCI field 2, respectively. DCI field 1 or 2 can include, but are not limited to, the MCS field, RV field, SRI field, antenna ports filed, CSI request field, precoding information and number of layer field, DL assignment filed, TPC command, among others.

In a further example, whether partial bits of one or more fields other than SRS request in DCI are used to indicate t value(s) can be determined by at least one of a plurality of factors. These include (i) a configured by RRC parameter, (ii) an indication by SRS request field in DCI, (iii) a determination of whether partial frequency sounding or SRS repetition is configured, (iv) if at least one of partial frequency sounding or SRS repetition is configured, partial bits of one or more fields other than SRS request in DCI are used to indicate t value(s), otherwise the partial bit are not used to indicate the slot offset value t, (v) a determination based on the RNTI of the monitored DCI, and/or (vi) a determination based on at least one CQI reported by UE. For example, if the one reported CQI (e.g., the most recently reported CQI) is smaller than a threshold, partial bits of one or more fields other than SRS request in DCI can be used to indicate t value(s), otherwise not.

According to a fifth scheme, to reduce the overhead of SRS transmission, one typical network implementation can be to configure a same set of one or more resources for multiple usages, e.g., codebook based UL and antenna switching. On the other hand, whether a same set of one or more SRS resources are used for multiple usages can involve different wireless communication device implementations. Hence, one way to solve this is that the wireless communication device 104 or 204 reports whether a same set of one or more SRS resources can be configured for multiple usages in its capability signaling.

In some implementations, the wireless communication device 104 or 204 can be configured with multiple SRS resources in one resource set, where the multiple resources can have different number of antenna ports. One use case of this configuration can be to support full power mode 2. Further, the wireless communication device 104 or 204 may use different implementations for different number of antenna ports. In this case, if the wireless communication device 104 or 204 is configured with multiple SRS resources in one resource set, the SRS resources with P ports in this resource set can be used for multiple usages, but the SRS resources with smaller than P ports in this resource cannot be used for antenna switching, where P is at least one of the following. P is the maximum number of ports per resources for the SRS resources in this resource set, and P is the maximum number of ports per resource that this UE can support.

In some implementations, the wireless communication device 104 or 204 can report whether a same set of one or more SRS resources can be configured for multiple usages per number of SRS ports in one resource in its capability signaling. For example, the wireless communication device 104 or 204 can report whether a same SRS resource can be configured for multiple usages for a 2-port resource, and whether a same SRS resource can be configured for multiple usages for a 4-port resource in full power mode 2.

According to a sixth scheme or approach, for Y SRS resources configured for nTmR antenna switching, where Y≥⌈m/n⌉, gap symbol(s) can exist between a subset of the Y SRS resources, and gap symbol(s) may not exist between another subset of the Y SRS resources. For example, for 4T6R antenna switching, if three resources are used where each resource has two ports, gap symbol(s) can exist between the first two resources, while gap symbol(s) may not exist between the last two resources. Alternatively, gap symbol(s) can exist between the last two resources, while gap symbol(s) may not exist between the first two resources. In a further example, the wireless communication device 104 or 204 can report the position of gap symbol(s) in its capability signaling. For example, in the 4T6R case, the wireless communication device 104 or 204 can report whether gap symbol(s) can exist between the first two resources, or between the last two resources.

In summary, for X SRS resources triggered by a DCI, the wireless communication device 104 or 204 can determine M available slots to transmit them. The location of the M≥1 available slots can determined at least by a t value. The wireless communication device 104 or 204 can be provided with one or more lists oft values by a first signaling, and a selection of one or more t values from the one or more lists can be indicated by a second signaling. The slot offset value t can be an integer smaller than 0. In such case, at least one available slot to transmit the triggered SRS can be the |t|-th available slot before a reference slot. The slot offset value t can be an integer greater than or equal to 0, in which case at least one available slot to transmit the triggered SRS can be the (t+1)-th available slot counting from a reference slot.

The reference slot can be at least one of the slot with the triggering DCI or the slot indicated by a RRC configured triggering offset. The wireless communication device 104 or 204 can perform collision handling between the triggered SRS and any other UL channel/signal after the determination of available slots. The triggered X SRS resources can be grouped into M groups based on configuration of the wireless communication node 102 or 202, or a predefined rule. The wireless communication device 104 or 204 can determine M available slots to transmit the X SRS resources in M groups based on a one-to-one mapping.

Each group can be an SRS resource set, or a subset containing at least one resource from an SRS resource set. The M groups can be determined (e.g., by the wireless communication device 104 or 204) based on at least one of (i) each group has an equal number of SRS resources based on a predefined rule, or (ii) each resource in the X SRS resource is associated with one group based on configuration by the wireless communication node 102 or 202, The first signaling can indicate a list of t values for each of the M groups. A codepoint state of the second signaling can be used to indicate t is associated with multiple t values, where each t value can be associated with one of the M groups. The second signaling can indicate a first available slot in the M available slots. The remaining available slots can be successive available slots starting from the first available slot. An available can be a slot satisfying at least one of (i) a slot that contains UL or flexible symbol(s) for the time-domain location(s) of the X triggered SRS resources, (ii) a slot that contains UL or flexible symbol(s) for the time-domain location(s) of the SRS resources in one of the M groups, (iii) A slot contains UL or flexible symbol(s) for the time-domain location(s) of at least one resource from the X SRS resources, or (iv) a slot that contains UL or flexible symbol(s) for the time-domain location(s) of at least one resource from a subset of the X SRS resources. The subset of the X SRS resources can satisfy at least one of (a) the SRS resources in the subset do not overlap in time domain, (b) there is at least one symbol gap between the time domain resources of any two from the subset of SRS resources, (c) if two SRS resources have overlapping symbols, the one with smaller ID, smaller index in the triggered X resources, and/or smaller start time-domain position is selected in the subset of SRS resources. For a given slot, the subset of the X SRS resources can exclude the SRS resources which have been transmitted before this slot.

The number of slots between the first and the last available slots in time to transmit the triggered SRS may not exceed a threshold of N_max slots. The value of N_max can be reported by the wireless communication device 104 or 204. The second signaling can be a DCI. Partial bits of one or more fields other than SRS request in DCI can be used to indicate one or more t values. The slot offset value t can be indicated by highest partial bits of one or more fields other than SRS request in DCI. The slot offset value t can be indicated by partial bits from multiple DCI fields. The wireless communication device 104 or 204 can concatenate bits from different DCI fields to determine the value t. Whether partial bits of one or more fields other than SRS request in DCI are used to indicate t value(s) can be determined by at least one of an indication by SRS request field in DCI, a determination whether partial frequency sounding or SRS repetition is configured, a determination based on the RNTI of the DCI, or a determination based on at least one CQI reported by the wireless communication device 104 or 204.

The various embodiments described above and in the claims can be implemented as computer code instructions that are executed by one or more processors of the wireless communication device (or UE) 104 04 204 or the wireless communication node 102 or 202. A computer-readable medium may store the computer code instructions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
receiving, by a wireless communication device from a wireless communication node, a first signaling indicative of at least one list of offset (t) values;
determining, by the wireless communication device, to group a plurality of sounding reference signal (SRS) resources into M groups of SRS resources, according to a configuration of the wireless communication node or a predefined rule;
determining, by the wireless communication device, M available slots each for transmitting a respective one of the M groups of SRS resources; and
receiving, by the wireless communication device from the wireless communication node, a second signaling indicative of at least a first t value to select from the at least one list of t values, wherein the first t value is used to indicate a location of at least a first available slot, of the M available slots, for transmission of a first group of the M groups of SRS resources, and the M available slots are successive available slots starting from the first available slot.

2. The method of claim 1, wherein:
the first t value is an integer smaller than 0, and the location of the available slot is a |t|-th available slot before a location of a reference slot; or
the first t value is an integer greater than or equal to 0, and the location of the available slot is a (t+1)-th available slot counting from a location of a reference slot.

3. The method of claim 2, wherein the reference slot comprises at least one of:
a slot with a downlink control information (DCI) triggering transmission of at least the first SRS resource, or a slot indicated by a triggering offset configured via radio resource control (RRC) signaling.

4. The method of claim 1, comprising:
performing, by the wireless communication device, collision handling between the transmission and any other uplink transmission, after available slots for the transmission have been determined.

5. The method of claim 1, wherein each of the M groups comprises:
an SRS resource set, or
a subset of an SRS resource set, the subset comprising at least one SRS resource.

6. The method of claim 1, comprising:
determining, by the wireless communication device, to group the plurality of SRS resources into the M groups of SRS resources, according to at least one of:
the predefined rule, which indicates that each of the M groups has an equal number of SRS resources from the plurality of SRS resources, or
the configuration of the wireless communication node, which indicates that each SRS resource of the plurality of SRS resources is associated with one of the M groups.

7. The method of claim 1, wherein the first signaling is indicative of a respective list of t values for each of the M groups.

8. The method of claim 1, wherein each available slot of the M available slots comprises a slot that includes one of: one or more uplink or flexible symbols for one or more time-domain locations of at least one SRS resource from the plurality of SRS resources or one or more uplink or flexible symbols for one or more time-domain locations of SRS resources in one of the M groups.

9. The method of claim 1, wherein each available slot of the M available slots comprises a slot that includes one or more uplink or flexible symbols for one or more time-domain locations of at least one SRS resource from a subset of the plurality of SRS resources, wherein at least one of:
SRS resources in the subset do not overlap in time domain,
a gap of a least one symbol is present between time domain resources of any two SRS resources from the subset, or
if two SRS resources from the subset have overlapping symbols in time domain, one of the two SRS resources having at least one of: a smaller identifier (ID), a smaller index within the plurality of SRS resources, or a smaller start position in time domain, relative to another of the two SRS resources, is selected for transmission.

10. The method of claim 9, wherein at least one of:
the subset excludes SRS resources from the plurality of SRS resources that have been transmitted prior to the available slot, or
a number of slots, between a first available slot and a last available slot for transmitting the plurality of SRS resources, does not exceed a threshold number of slots.

11. The method of claim 10, comprising:
reporting, by the wireless communication device to the wireless communication node, the threshold number of slots.

12. The method of claim 1, wherein at least one of:
the second signaling comprises downlink control information (DCI), and at least one bit of one or more fields other than SRS request field in the DCI are used to indicate the first t value;
or
at least one most significant bit (MSB) of the one or more fields other than SRS request field in the DCI are used to indicate the first t value, or
at least one bit of a first field in the DCI and at least one bit of a second field in the DCI are concatenated to indicate the first t value;
or
whether the at least one bit of one or more fields other than SRS request field in the DCI are used to indicate the first t value, is determined according to at least one of:
the SRS request field,
whether partial frequency sounding or SRS repetition is configured,
a radio network temporary identifier (RNTI) of the DCI, or
at least one channel quality indicator (CQI) reported by the wireless communication device.

13. A wireless communication device, comprising:
a memory and at least one processor configured to:
receive, via a receiver from a wireless communication node, a first signaling indicative of at least one list of offset (t) values;
determine to group a plurality of sounding reference signal (SRS) resources into M groups of SRS resources, according to a configuration of the wireless communication node or a predefined rule;
determine M available slots each for transmitting a respective one of the M groups of SRS resources; and
receive, via the receiver from the wireless communication node, a second signaling indicative of at least a first t value to select from the at least one list of t values, wherein the first t value is used to indicate a location of at least a first available slot, of the M available slots, for transmission of a first group of the M groups of SRS resources, and the M available slots are successive available slots starting from the first available slot.

14. The wireless communication device of claim 13, wherein:
the first t value is an integer smaller than 0, and the location of the available slot is a |t|-th available slot before a location of a reference slot; or
the first t value is an integer greater than or equal to 0, and the location of the available slot is a (t+1)-th available slot counting from a location of a reference slot.

15. The wireless communication device of claim 13, wherein each available slot of the M available slots comprises a slot that includes one of: one or more uplink or flexible symbols for one or more time-domain locations of at least one SRS resource from the plurality of SRS resources or one or more uplink or flexible symbols for one or more time-domain locations of SRS resources in one of the M groups.

16. The wireless communication device of claim 13, wherein each available slot of the M available slots comprises a slot that includes one or more uplink or flexible symbols for one or more time-domain locations of at least one SRS resource from a subset of the plurality of SRS resources, wherein at least one of:
SRS resources in the subset do not overlap in time domain,
a gap of a least one symbol is present between time domain resources of any two SRS resources from the subset, or
if two SRS resources from the subset have overlapping symbols in time domain, one of the two SRS resources having at least one of: a smaller identifier (ID), a smaller index within the plurality of SRS resources, or a smaller start position in time domain, relative to another of the two SRS resources, is selected for transmission.

17. The wireless communication device of claim 13, wherein each of the M groups comprises:
   an SRS resource set, or
   a subset of an SRS resource set, the subset comprising at least one SRS resource.

18. The wireless communication device of claim 13, wherein the first signaling is indicative of a respective list of t values for each of the M groups.

19. A method, comprising:
   transmitting, by a wireless communication node to a wireless communication device, a first signaling indicative of at least one list of offset (t) values;
   providing, by the wireless communication node to the wireless communication device, a configuration indicative of M groups of sounding reference signal (SRS) resources of a plurality of SRS resources, the wireless communication device determining M available slots each for transmitting a respective one of the M groups of SRS resources; and
   transmitting, by the wireless communication node to the wireless communication device, a second signaling indicative of at least a first t value to select from the at least one list of t values, wherein the first t value is used to indicate a location of at least a first available slot, of the M available slots, for transmission of a first group of the M groups of SRS resources, and the M available slots are successive available slots starting from the first available slot.

20. A wireless communication node, comprising:
   a memory and at least one processor configured to:
      transmit, via a transmitter to a wireless communication device, a first signaling indicative of at least one list of offset (t) values;
      provide, by the wireless communication node to the wireless communication device, a configuration indicative of M groups of sounding reference signal (SRS) resources of a plurality of SRS resources, the wireless communication device determining M available slots each for transmitting a respective one of the M groups of SRS resources; and
      transmit, via the transmitter to the wireless communication device, a second signaling indicative of at least a first t value to select from the at least one list of t values, wherein the first t value is used to indicate a location of at least a first available slot, of the M available slots, for transmission of a first group of the M groups of SRS resources, and the M available slots are successive available slots starting from the first available slot.

* * * * *